R. M. CLIFT.
DEVICE FOR REMOVING GREEN CORN FROM THE COB.
APPLICATION FILED MAY 21, 1908.
903,056.
Patented Nov. 3, 1908.
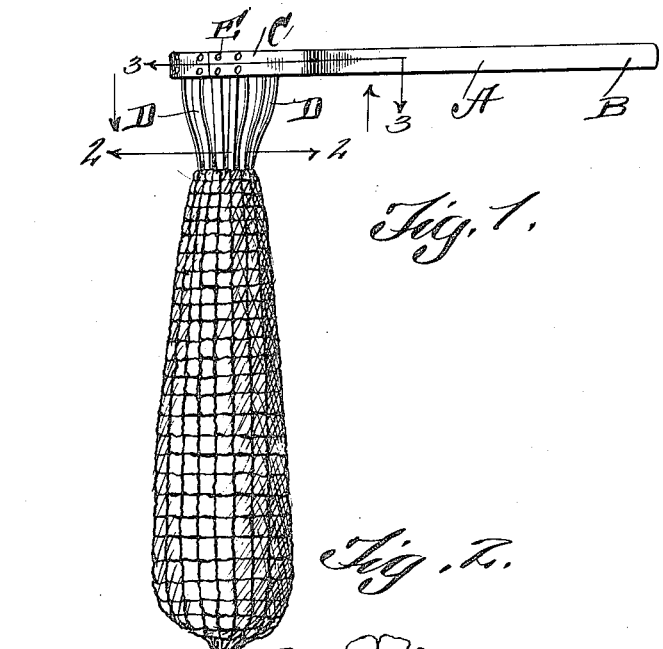
Fig. 1.
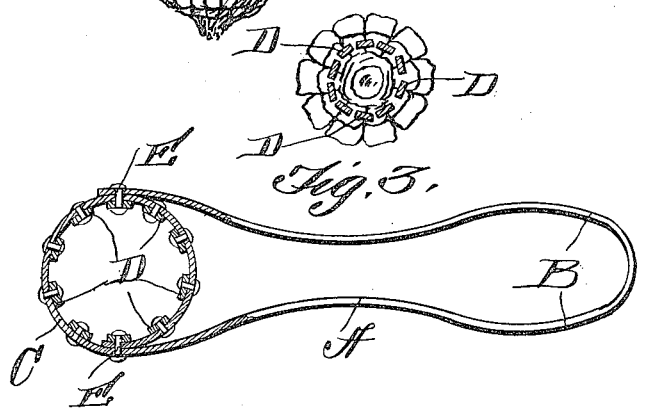
Fig. 2.
Fig. 3.
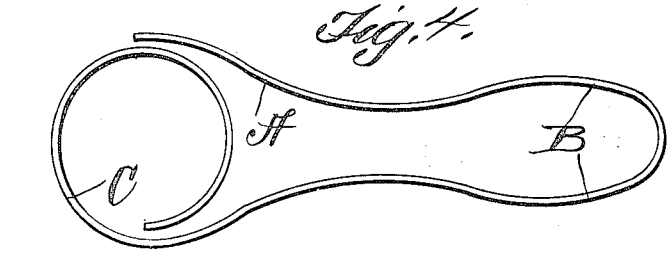
Fig. 4.
Witnesses
R. H. Boswell,
Mattie E. Kelly.
Inventor
Richard M. Clift,
By Franklin N. Hough
Attorney

UNITED STATES PATENT OFFICE.

RICHARD M. CLIFT, OF WOODRIDGE, DISTRICT OF COLUMBIA.

DEVICE FOR REMOVING GREEN CORN FROM THE COB.

No. 903,056.      Specification of Letters Patent.      Patented Nov. 3, 1908.

Application filed May 21, 1908. Serial No. 434,144.

*To all whom it may concern:*

Be it known that I, RICHARD M. CLIFT, a citizen of the United States, residing at Woodridge, District of Columbia, have invented certain new and useful Improvements in Devices for Removing Green Corn from the Cob; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in devices for use in removing green corn from the cob and it has for its object the provision of a simple and inexpensive tool provided with a series of blades so arranged that the kernels may be simultaneously removed from the entire cob by a single motion without bruising or crushing the kernels.

To this end and to such others as the invention may pertain, the same consists in the peculiar construction of the tool and in the novel combination, arrangement and adaptation of parts, all as will be hereinafter fully described and then specifically defined in the appended claim.

The invention is illustrated in the accompanying drawings which, with the letters of reference marked thereon, form a part of this specification and in which:—

Figure 1 is a side elevation showing the device in use. Fig. 2 is a transverse section on line 2—2 of Fig. 1. Fig. 3 is a sectional view on line 3—3 of Fig. 1, and Fig. 4 is a top plan view of the metallic strip which forms the handle and body portion of the device.

Reference now being had to the details of the drawings by letter, A designates a metallic strip bent to form the handle portion B and the opposite end of the strip is bent to form substantially a circular portion or head C. The free ends of the strip are bolted or otherwise secured together, as shown at E.

D—D designate tines or blades, the upper ends of which are slightly wider than the body portion and are secured to the inner circumference of the circular head C, the free ends of said tines or blades being sharpened and the sharpened ends being inclined inwardly, as shown clearly in Fig. 1 of the drawings.

The number of blades or tines employed may be varied to accord with the number of rows of kernels upon the ear of corn from which the kernels are to be removed. In the present instance, I have shown ten blades, although the number can be varied as desired.

While I have shown the device as constructed of a single metallic strip bent as shown and described, it will be at once evident that the device might as well be constructed of cast metal and provided with any suitable form of handle in lieu of the loop handle which I have shown in the drawings.

From the foregoing description, the operation of the device will be at once and readily understood. The cutting ends of the tines or blades D are applied to the smaller end of the ear of corn to be operated upon, the blades in each instance being designed to be inserted so that the longitudinal center of each blade will correspond with the seams between the rows of kernels upon the ear and the device is then forced downward, thus serving to effectually remove all of the kernels from the ear. The position of the blades or tines with reference to the kernels upon the ear insures the removal of the kernels without crushing or breaking.

Having thus described my invention, what I claim to be new and desire to secure by Letters Patent is:—

A device for removing green corn from the cob comprising a strip which is bent upon itself to form a handle, one end of the strip being bent to form a ring which is fastened to the arms of the handle at points diametrically opposite, and fingers converging toward their outer ends fastened to said ring, as set forth.

In testimony whereof I hereunto affix my signature in the presence of two witnesses.

RICHARD M. CLIFT.

Witnesses:
M. E. KELLY,
FRANKLIN H. HOYT.